United States Patent [19]
Gerth et al.

[11] Patent Number: 5,649,078
[45] Date of Patent: Jul. 15, 1997

[54] EFFICIENT TWO-PASS RASTERIZATION SCHEME UTILIZING VISIBILITY INFORMATION

[75] Inventors: John Alan Gerth, Danbury, Conn.; Shawn Anthony Hall, Pleasantville; William Louis Luken, Yorktown Heights, both of N.Y.

[73] Assignee: International Business Machines Corporation, Armonk, N.Y.

[21] Appl. No.: 408,513

[22] Filed: Mar. 22, 1995

[51] Int. Cl.⁶ .................................................. G06T 15/00
[52] U.S. Cl. ............................................................ 395/122
[58] Field of Search .................... 395/118–122, 133–135

[56] References Cited

U.S. PATENT DOCUMENTS

| | | | |
|---|---|---|---|
| 4,876,644 | 10/1989 | Nuechterlein et al. | 364/200 |
| 5,123,085 | 6/1992 | Wells et al. | 395/122 X |
| 5,220,646 | 6/1993 | Fossum | 395/122 |
| 5,329,613 | 7/1994 | Brase et al. | 395/122 |
| 5,357,599 | 10/1994 | Luken | 395/134 |
| 5,402,532 | 3/1995 | Epstein et al. | 395/122 |

FOREIGN PATENT DOCUMENTS

| | | |
|---|---|---|
| 0489594A3 | 6/1992 | European Pat. Off. . |
| 9002990 | 3/1990 | WIPO . |

OTHER PUBLICATIONS

N.Greene et al, "Hierarchical Z–Buffer Visibility", Computer Graphic Proc., Annual Conf. Series, 1993 pp. 231–238.

Foley et al, Computer Graphics: Principles and Practice, 2nd ed. 1990, pp. 124–127, pp. 721–814, p. 884.

S. Boinodiris, IBM Tech. Disc. Bulletin "Generalized Depth Candidacy Theorem and Its Application" V.23, #2, Jul. 1980, pp. 470–473.

US Patent Application, S.N. 08/006,002, filed Jan. 15, 1993, entitled "Methods and Apparatus for Reducing Illumination Calculations Through Efficient Visibility Determination" R.L.Hochmuth et al.

*Primary Examiner*—Almis R. Jankus
*Attorney, Agent, or Firm*—Jay P. Sbrollini

[57] ABSTRACT

The rasterization process is separated into two modes, a test mode and a normal mode, to eliminate shading calculations associated with all-hidden triangles, thereby providing improved efficiency over prior rasterization schemes.

16 Claims, 7 Drawing Sheets

```
for ( each triangle T in the scene )
{
    Setup for scan conversion and visibility testing.
    allHidden = TRUE;
    for ( each scanline L in T )
    {
        Scan Conversion: determine the set S_L of pixels on L which are covered by T.
        for ( each pixel p in S_L )
        {
            if ( T is visible at p )
            {
                allHidden = FALSE;
                L = Last scanline in T  /* Artificial assignment to force termination of L loop. */
                break;                  /* Abort Test Mode. */
            }  /* End if */

}  /* End loop on pixels p */

}  /* End loop on scanlines L */ if ( allHidden = = FALSE )
    {
        Setup for shading.
        for ( each scanline L in T )
        {
            Scan Conversion: determine the set S_L of pixels on L which are covered by T.
            for ( each pixel p in S_L )
            {
                Perform shading calculations.†
                if ( T is visible at p )
                {
                    Update visibility data (z) for p.
                    Update color data (r, g, b) for p.
                }

}  /* End loop on pixels p */

}  /* End loop on scanlines L */

}  /* End if ( allHidden = = FALSE ) */

}  /* End loop on triangles T */
```

FIG. 5

```
for ( each triangle T in the scene )
{
    Setup for scan conversion and visibility testing.
    allHidden = TRUE;
    for ( each scanline L in T )
    {
        Scan Conversion: determine the set $S_L$ of pixels on L which are covered by T.
        for ( each pixel p in $S_L$ )
        {
            if ( T is visible at p )
            {
                allHidden = FALSE;
                FirstVisibleLine = L;
                L = Last scanline in T    /* Artificial assignment to force termination of L loop. */
                break;                    /* Abort Test Mode. */
            } /* End if */

} /* End loop on pixels p */

} /* End loop on scanlines L */ if ( allHidden = = FALSE )
    {
        Setup for shading; initialize to FirstVisibleLine.
        for ( each scanline L starting with FirstVisibleLine -- exclude previous lines )
        {
            Scan Conversion: determine the set $S_L$ of pixels on L which are covered by T.
            for ( each pixel p in $S_L$ )
            {
                Perform shading calculations.†
                if ( T is visible at p )
                {
                    Update visibility data (z) for p.
                    Update color data (r, g, b) for p.
                }

} /* End loop on pixels p */

} /* End loop on scanlines L */

} /* End if ( allHidden = = FALSE ) */

} /* End loop on triangles T */
```

FIG. 6

```
for ( each triangle T in the scene )
{
        Setup for scan conversion, visibility testing, and shading.
        for ( each scanline L in T )
        {
                Scan Conversion: determine the set $S_L$ of pixels on L which are covered by T.
                allHidden = TRUE;
                for ( each pixel p in $S_L$ )
                {
                        if ( T is visible at p )
                        {
                                allHidden = FALSE;
                                break;                    /* Abort Test Mode. */
                        } /* End if */

} /* End loop on pixels p */ if ( allHidden = = FALSE )
                {
                        for ( each pixel p in $S_L$ )
                        {
                                Perform shading calculations.†
                                if ( T is visible at p )
                                {
                                        Update visibility data (z) for p.
                                        Update color data (r, g, b) for p.
                                }

} /* End loop on pixels p */

} /* End if ( allHidden = = FALSE ) */

} /* End loop on scanlines L */

} /* End loop on triangles T */
```

EFFICIENT TWO-PASS RASTERIZATION SCHEME UTILIZING VISIBILITY INFORMATION

BACKGROUND OF THE INVENTION

1. Technical Field

The invention relates to a computer graphics system for processing and displaying graphical data representing three-dimensional objects, and, more particularly, to the rasterization of the objects for display.

2. Description of the Prior Art

Computer graphics systems are frequently used to model a scene having three-dimensional objects and display the scene on a two-dimensional display device such as a cathode ray tube or liquid crystal display. Typically, the three-dimensional objects of the scene are each represented by a multitude of polygons (or primitives) that approximate the shape of the object. Rendering the scene for display on the two-dimensional display device is a computationally intensive process. It is therefore frequently a slow process, even with today's microprocessors and graphics processing devices.

Figure 1A:
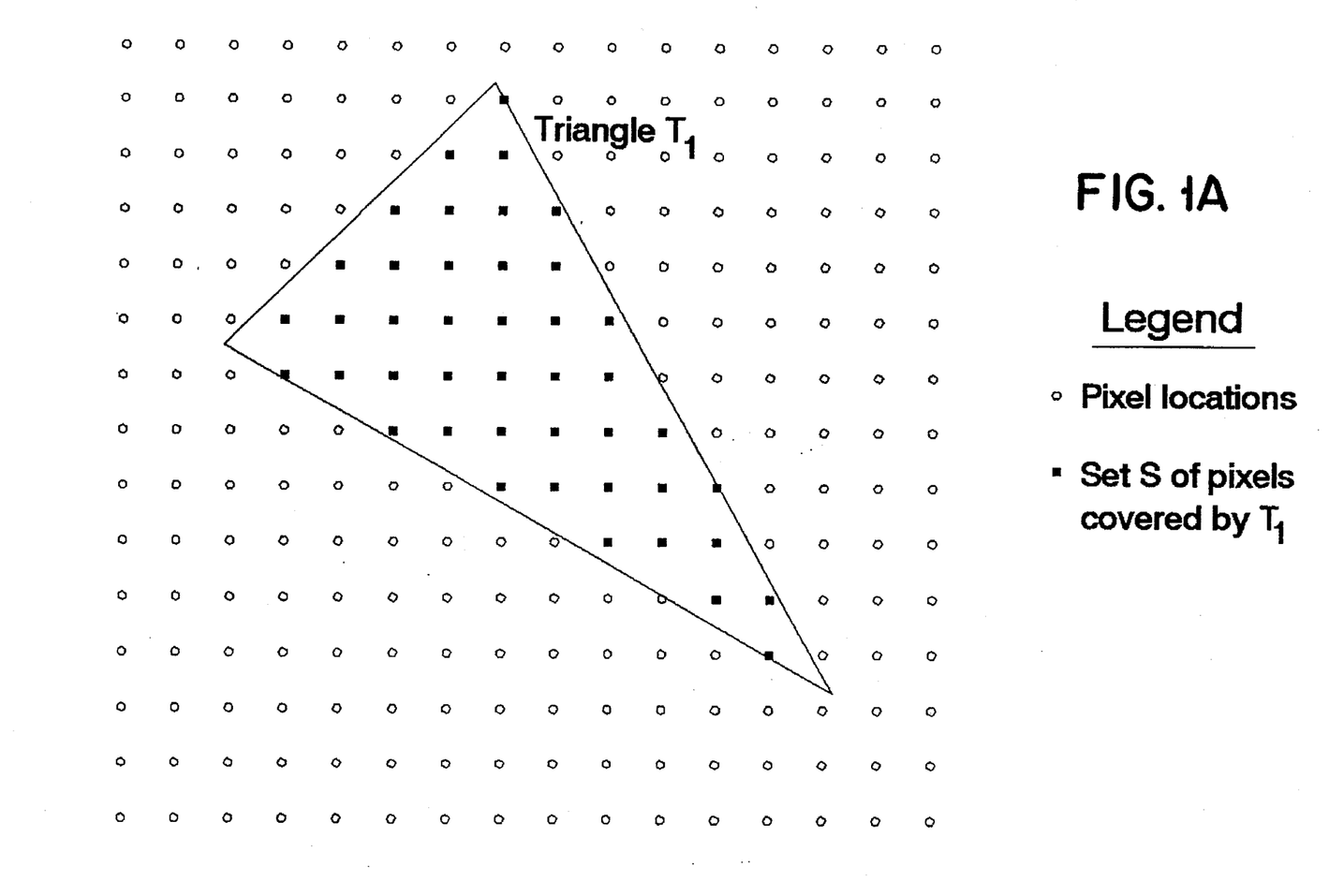
FIG. 1A is a pictorial representation of the rasterization of a triangle T1.

Rasterization is the process which converts the simple, geometric description of a graphics primitive into pixels for display. A typical primitive, as shown in FIG. 1A, is a triangle $T_1$. Other area or surface primitives conventionally are converted into one or more triangles prior to rasterization. Consequently, the conventional rasterization process need only to handle triangles. The triangle $T_1$ is represented by the (x,y,z) coordinates and other properties (such as colors and texture coordinates) at each of its vertices. The (x,y) coordinates of a vertex tell its location in the plane of the display. The z coordinate tells how far the vertex is from the selected view point of the three-dimensional scene. Rasterization may be divided into three tasks: scan conversion, shading, and visibility determination.

Scan conversion utilizes the (x,y) coordinates of the vertices of each triangle to compute a set of pixels S which cover the triangle.

Shading computes the colors of each pixel in the set S. There are numerous schemes for computing colors, some of which involve computationally intensive techniques such as texture mapping.

Figure 1B:
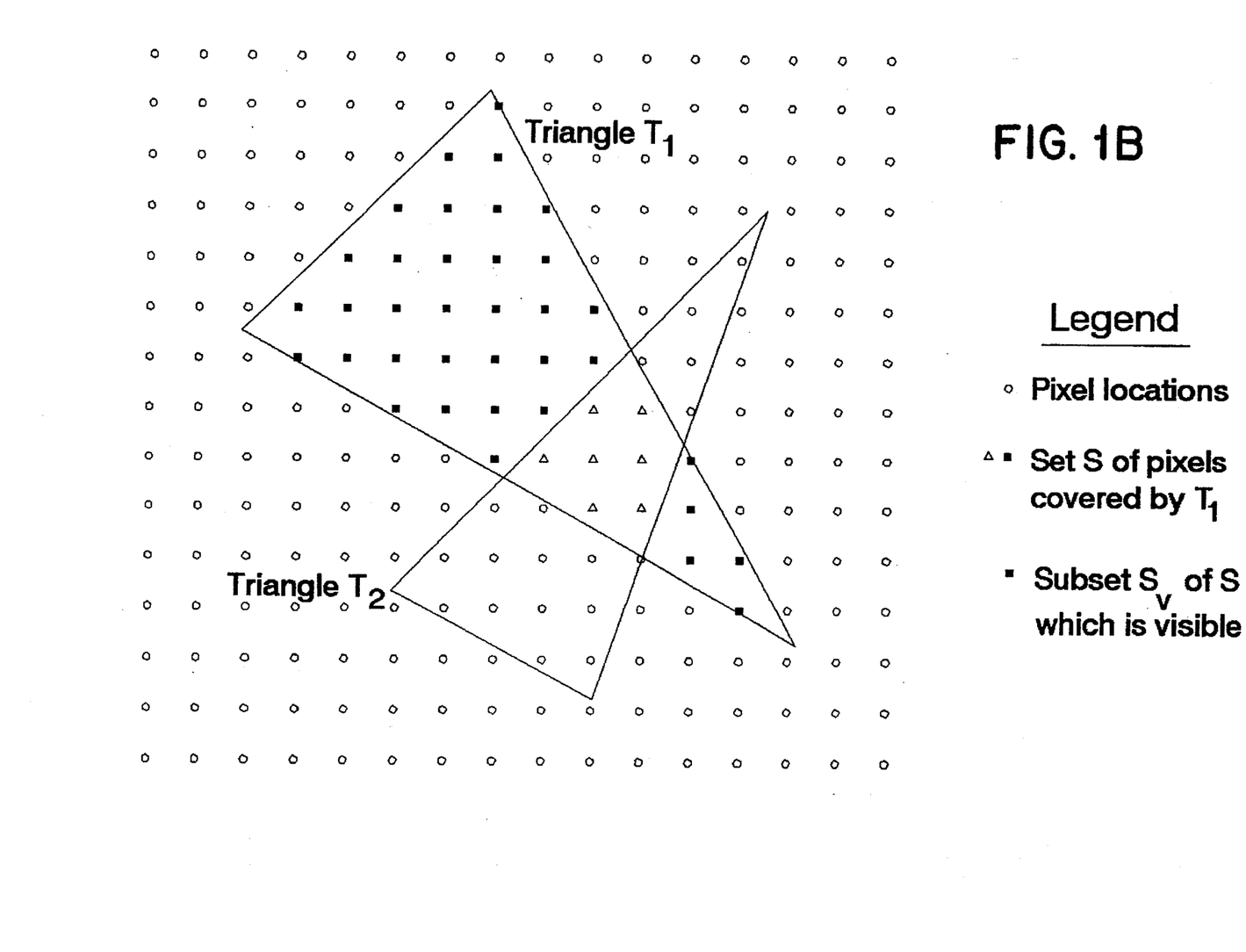
FIG. 1B is a pictorial representation of the rasterization of triangles T1 and T2, wherein triangle T1 is partially hidden by triangle T2.

Visibility determination utilizes the z coordinate, also called the depth value, of each pixel to compute the set of pixels $S_v$ (a subset of S) which are "visible" for the triangle. The z coordinate of each pixel may be determined by interpolation between the z coordinate specified for each vertex of the triangle. The set $S_v$ will differ from the set S if any of the pixels in set S cover the previously rasterized triangles whose z values are closer to the selected view point. Thus, for each triangle in the scene, a pixel is "visible" if it is in the set $S_v$, or "hidden" if it is the set S but not in the set $S_v$. Moreover, a triangle is "all visible" if the set $S_v$ is identical to set S, "partially hidden" if the set $S_v$ is not identical to set S and set $S_v$ is not empty, or "all hidden" if set $S_v$ is empty. For example, FIG. 1B shows two triangles, T1 and T2, wherein triangle T1 is partially hidden by triangle T2.

Moreover, the rasterization process may include lighting calculations that simulate the effects of light sources upon the surfaces of the triangles of the scene. Typically, the position of each triangle is identified by (x,y,z) coordinates of a set of three vertices, with each vertex having a reflectance normal vector with the vertex at its origin. The reflectance normal vectors of each triangle along with information about the position of the light sources are used to calculate the effect of the light sources on the color values determined during the shading calculations for each triangle.

Rasterization is completed by writing the colors of the set of visible pixels $S_v$ to an image buffer for display, and writing the z coordinate of the set of visible pixels $S_v$ to a Z-buffer.

Rasterization is typically the bottleneck in the rendering process. Therefore, the efficiency of the rasterization process and, in particular, the shading operation is extremely important. Typically, the shading operation calculates the color of each pixel in the set S, whether or not the pixel is in fact "visible". Then, during visibility testing, if the pixel is found to be visible, the color of the pixel is written to the image buffer. For triangles which are entirely hidden, the shading calculations are wasted at every pixel, which decreases the efficiency of the rasterization process.

Thus, there is a need for a computer graphics system that is more computationally efficient and that reduces the number of unnecessary shading calculations during the rendering process.

SUMMARY OF THE INVENTION

The above-stated problems and related problems of the prior art are solved with the principles of the present invention, method and apparatus providing efficient rasterization. Rasterization is divided into two modes: a test mode and a normal mode. In the test mode, the triangles are decomposed into scan lines each having one or more pixels. Each pixel within a first scan line is then tested for visibility. When the first visible pixel is found, the flow branches to normal mode, otherwise flow continues to the next scan line until all scan lines have been tested for visibility.

In the first embodiment of the present invention, in normal mode, shading calculations and visibility testing are performed on each pixel of each scan line covering the triangle. If the pixel is visible, the z-buffer and frame buffer are updated accordingly. If the pixel is not visible, flow continues to the next pixel.

In the second embodiment, during the test mode, an ID that identifies the scan line currently being tested is stored. Like the first embodiment, when the first visible pixel is found, operation branches to normal mode. However, in normal mode, unlike the first embodiment wherein the shading calculations and visibility tests are performed for each scan line of the triangle, the shading calculations and visibility testing are performed only for the scan line identified by the stored ID and those subsequent thereto. For each pixel within these scan lines, the shading calculations and visibility testing are performed to determine whether the pixel is visible. If the pixel is visible, the z-buffer and frame buffer are updated accordingly. If the pixel is not visible, flow continues to the next pixel.

These rasterization schemes perform shading calculations for each triangle only if a visible pixel is found, thus eliminating shading calculations performed for all-hidden, triangles and increasing the efficiency of the rasterization process.

DETAILED DESCRIPTION OF THE PREFERRED EMBODIMENTS

Figure 2:
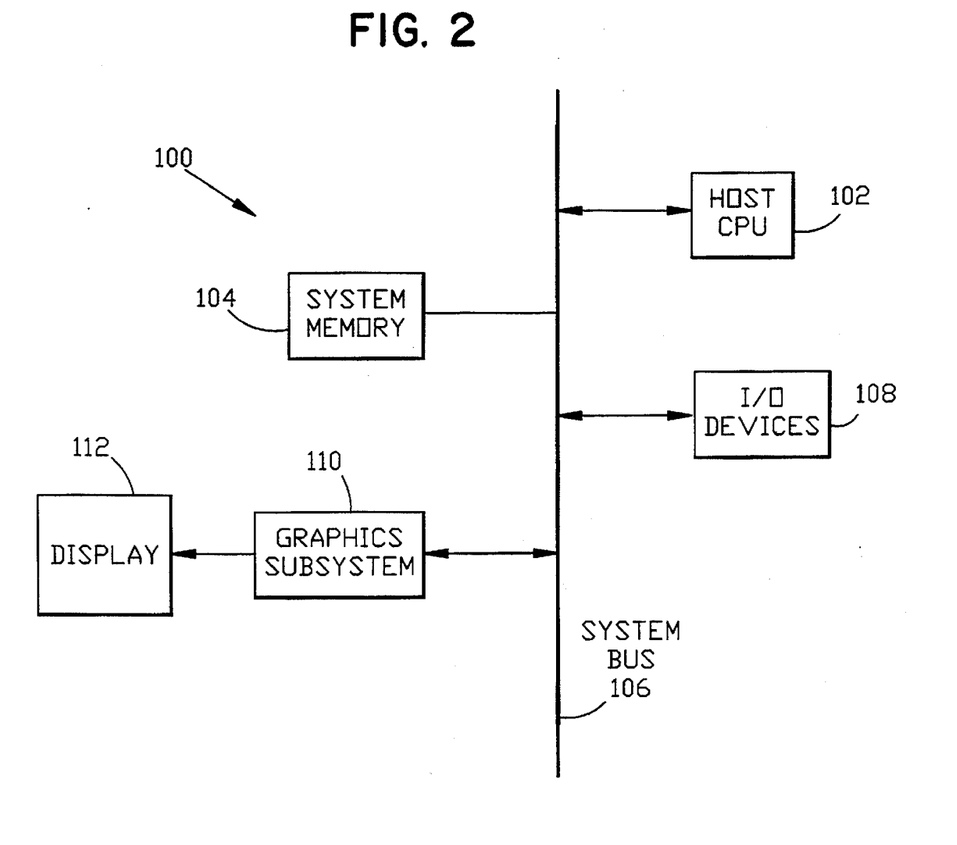
FIG. 2 is functional block diagram of a graphics work station.

The overall architecture of the present invention is depicted in FIG. 2. As shown, a graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates and attributes (e.g. color, reflectance, texture) of primitives. The primitives are geometric entities such as a polygon, line or surface. Typically, the primitives are triangles defined by the coordinates and other properties (such as colors, normals, texture) of a set of three vertices. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices that specify how the triangles are situated and oriented in the scene. Input/output (I/O) devices 108 interface to the host processor 102 via the system bus 106. The I/O devices may include a keyboard, template or touch pad for text entry and/or a pointing device such as a mouse, trackball, Spaceball or light pen for user input.

The graphics system 100 also includes a graphics subsystem 110 that interfaces to the system memory 104 via the system bus 106. Generally, the graphics subsystem 110 operates to render the graphics data stored in the system memory 104 for display on a display screen 112. Although the graphics subsystem is illustrated as part of a graphics work station, the scope of the present invention is not limited thereto. Moreover, the graphics subsystem 110 of the present invention as described below may be implemented in hardware such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety. In the alternative, portions of the graphics subsystem 110 may be implemented in software together with a processor. The processor may be a conventional general purpose processor, a part of the host processor 128, or part of a co-processor integrated with the host processor 128.

Figure 3:
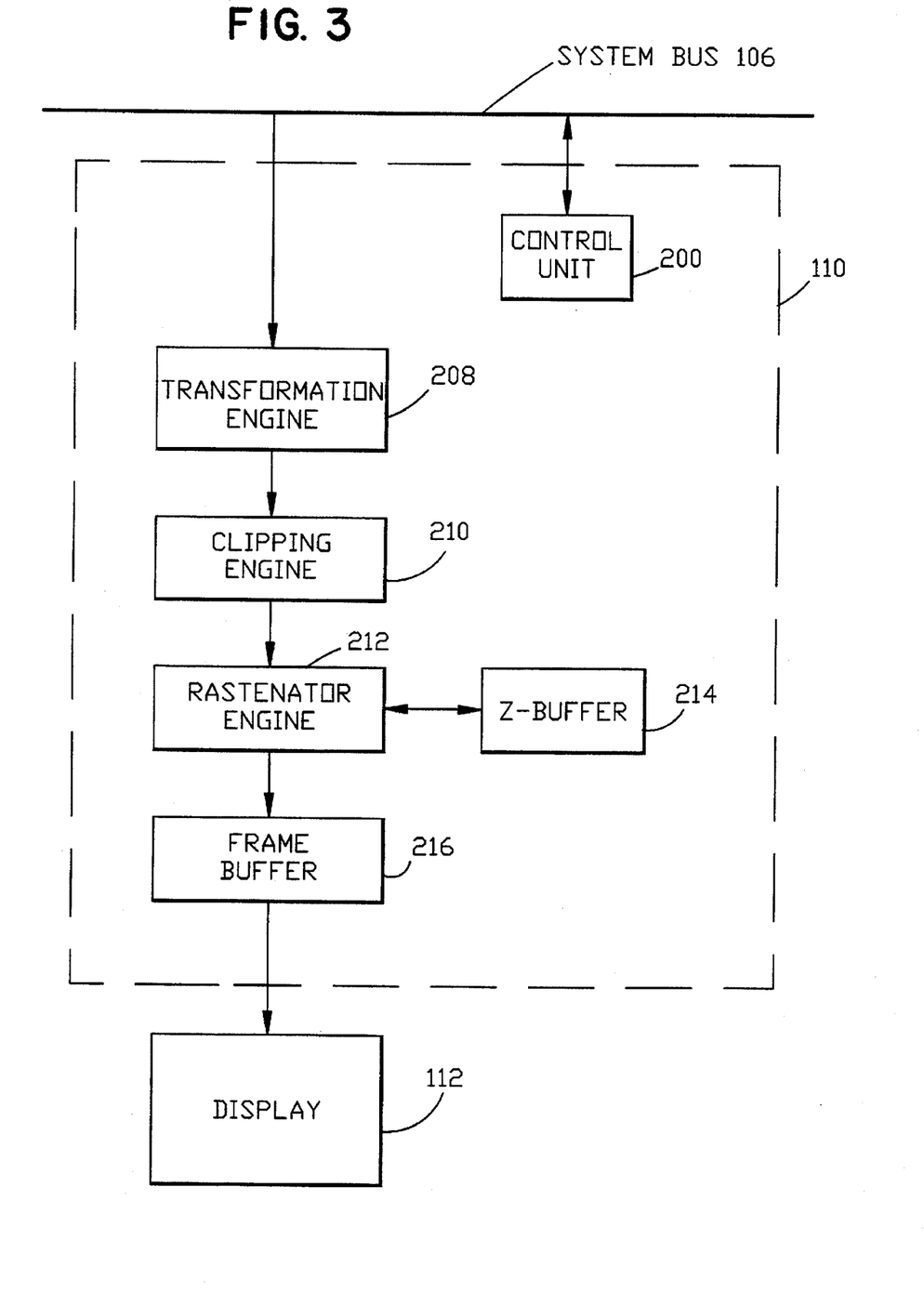
FIG. 3 is a functional block diagram of a graphics subsystem of the graphics work station of FIG. 2.

More specifically, as shown in FIG. 3, the graphics subsystem 110 includes a control unit 200 that supervises the operation of the graphics subsystem 110. The control unit 200 selects the graphics data associated with one or more triangles, as stored in the system memory 104, and passes the graphics data on to a rendering pipeline via the system bus 106.

The rendering pipeline includes a transformation engine 208, a clipping engine 210, a rasterization engine 212, Z-buffer 214 and a frame buffer 216. Z-buffer 214 typically contains sufficient memory to store a depth value for each pixel of the display 112. Conventionally, the depth value is stored as a 24-bit integer for each pixel. Frame buffer 216 typically contains sufficient memory to store color data for each pixel of the display 112. Conventionally, the color data consists of three 8-bit integers representing red, green and blue (r,g,b) color values for each pixel. In addition, the rendering pipeline may include a texture memory (not shown) for storing texture maps.

The transformation engine 208 transforms the graphics data from the intrinsic coordinate system of the model into a normalized device coordinate system. In the case where the graphics data consists of coordinates of vertices of the triangles that define the objects of the three-dimensional scene, the transformation engine 206 outputs the coordinates of the vertices in a normalized device coordinate system. A more detailed description of the transformation operation may be found in Foley, Van Dam, Feiner and Hughes, Computer Graphics Principles and Practice, pp. 124–127 (2nd Ed. 1990), herein incorporated by reference in its entirety.

The clipping engine 210 clips the transformed triangles against a predefined clipping volume to define the portions of the transformed triangles that are potentially visible. The result of this step is a list of vertices in the normalized device coordinate system that describe potentially visible portions of the triangles. A more detailed operation of the clipping operation may be found in Foley, Van Dam, Feiner and Hughes, Computer Graphics Principles and Practice, pp. 124–127 (2nd Ed. 1990), incorporated by reference above in its entirety.

The rasterization engine 212 decomposes the potentially visible portion of the triangles output by the clipping engine 210 to calculate and store in the frame buffer 216 the color of visible pixels which cover each triangle. In doing so, the rasterization engine performs the following operations: scan conversion, visibility determination and shading.

According to the present invention, for each triangle having a potentially visible portion, the operations of the rasterization engine 212 are divided into two modes: a test mode and a normal mode. In the test mode, the rasterization engine 212 decomposes the triangle into scan lines each having zero or more pixels. For each pixel within each scan line, the rasterization engine 212 computes the z coordinate (depth value) of the pixel and tests whether the pixel is visible by comparing the z coordinate calculated for this pixel to the corresponding entry in the z-buffer 214. When the first visible pixel is found, the flow of the rasterization engine 212 branches to normal mode, otherwise flow continues to the next scan line until all scan lines have been tested for visibility.

In the first embodiment of the present invention, in normal mode, the rasterization engine 212 performs shading calculations and visibility testing on each pixel of each scan line covering the triangle. If the pixel is visible, the rasterization engine 212 updates the z-buffer 214 and frame buffer 216 accordingly. If the pixel is not visible, flow continues to the next pixel. By this method, the shading calculations are performed for the triangle only if a visible pixel is found, thus eliminating shading calculations performed on hidden triangles and increasing the efficiency of the rasterization process.

In the second embodiment, during the test mode, the rasterization engine 212 stores an ID that identifies the scan line currently being tested. Like the first embodiment, when the first visible pixel is found, operation branches to normal mode. However, in normal mode, unlike the first embodiment wherein the rasterization engine 212 performs shading calculations and visibility tests for each scan line of the triangle, the rasterization engine 212 performs shading calculations and visibility testing only for the scan line identified by the stored ID and those subsequent thereto. For each pixel within these scan lines, the rasterization engine performs shading calculations and visibility testing to determine whether the pixel is visible. If the pixel is visible, rasterization engine 212 updates the z-buffer 214 and frame buffer 216 accordingly. If the pixel is not visible, flow continues to the next pixel. This method also performs shading calculations for each triangle only if a visible pixel is found, thus eliminating shading calculations performed on hidden triangles and increasing the efficiency of the rasterization process.

Figure 4:
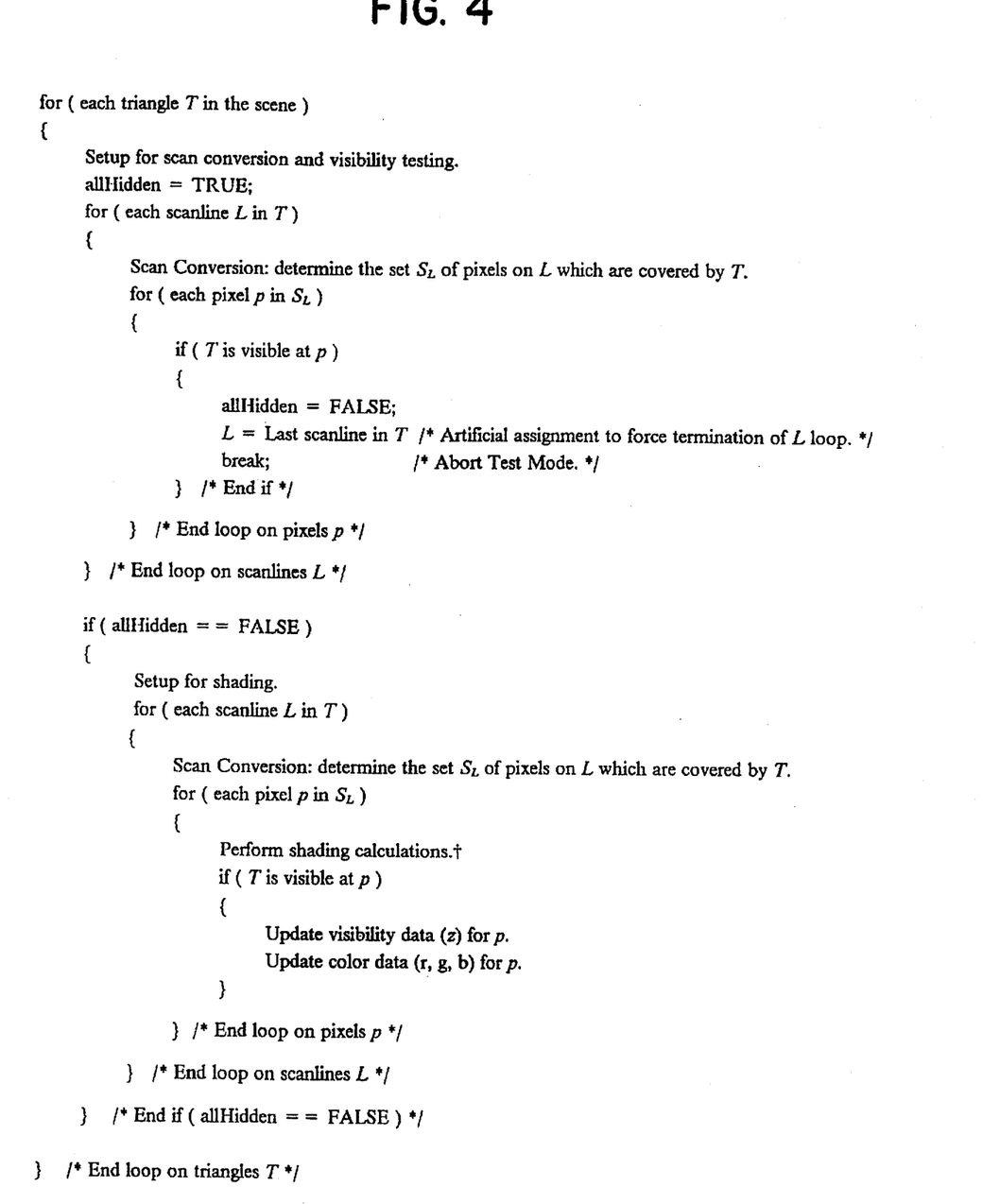
FIG. 4 is pseudocode that illustrates the operation of the rasterization engine of FIG. 3 according to a first embodiment of the present invention.

The specific operation of the rasterization engine 212 according to the first embodiment of the present invention is shown in FIG. 4. For each triangle T in the scene, the rasterization engine 212 initially enters the test mode and performs setup operations required for scan conversion (such as the computation of the derivatives dx/dy along the two edges which emanate from the triangle's top vertex) and setup operations required for visibility testing (such as the computations of the derivatives dz/dx and dz/dy across the face of the triangle. Next, an allHidden flag is defined that in subsequent calculations will indicate the visibility of the triangle. For example, the allHidden flag having a value of true may indicate the triangle T is entirely hidden, and the allHidden flag having a value of false may indicate the triangle T is partially or fully visible. The allHidden flag is then initialized to indicate that the triangle T is entirely hidden, for example, by setting the value of the allHidden flag value to true.

The rasterization engine 212 then decomposes the triangle T into one or more scan lines. For a first scan line L covering the triangle T, the rasterization engine 212 then determines the set of pixels $S_L$ on the scan line L covering T. A more detailed description of the steps performed in decomposing the triangle T into scan lines and associated pixels may be found in Foley, Van Dam, Feiner and Hughes, Computer Graphics Principles and Practice, p. 884 (2nd Ed. 1990), incorporated by reference above in its entirety. The rasterization engine 212 then continues the test mode by testing the visibility of each pixel within the set $S_L$. As is conventional, visibility testing is performed by comparing the depth value of the pixel of set $S_L$ with the depth value stored in the Z-buffer 214. If a visible pixel is found on the scan line L, the rasterization engine 212 ends the test mode by setting the allHidden flag to false and then branches to normal mode. However, if a visible pixel is not found on the scan line L, operation continues to the next scan line for scan conversion and visibility testing. If all scan lines of the triangle T have been scan converted and visibility tested in the test mode and yet no visible pixel has been found (i.e. the allHidden flag is still true), the normal operation mode of the triangle is bypassed and the operation of the rasterization engine 212 continues to the next triangle until all triangles in the three-dimensional scene have been processed by the rasterization engine 212.

As shown in FIG. 4, in normal mode, the rasterization engine 212 begins by performing setup operations required for shading calculations, such as the computation of partial derivatives $\partial r/\partial x$, $\partial r/\partial y$, $\partial g/\partial x$, $\partial g/\partial y$, $\partial b/\partial x$, $\partial b/\partial y$ based upon the given (r,g,b) color values and (x,y) coordinates at the triangle's vertices. Similar setup operations may be required for texture coordinates. For each scan line L, the rasterization engine 212 determines the set of pixels $S_L$ covering T. After determining the set of pixels $S_L$ on the scan line L, the rasterization engine 212 continues the normal mode by performing visibility testing and shading for each pixel in the set $S_L$. If during visibility testing the rasterization engine 212 determines the triangle T is visible at a particular pixel within the set $S_L$, the depth value stored in the Z-buffer 212 at an address corresponding to the particular pixel is updated with the depth value of the triangle T at the particular pixel, and the r,g,b values of the triangle at the particular pixel calculated during shading are written to an address of the frame buffer 216 that corresponds to the particular pixel.

However, if during visibility testing, the rasterization engine 212 determines triangle T is not visible at a particular pixel within the set $S_L$, flow continues to the next pixel for visibility testing and shading until all pixels in the set $S_L$ have been processed. Upon looping through all pixels in the set $S_L$, the rasterization engine 212 continues the operations described above for the next scan line. If all scan lines of the triangle T have been processed in the normal mode, the operation of the rasterization engine 212 continues to the next triangle until all triangles in the three-dimensional scene have been processed by the rasterization engine 212.

The shading calculations referred to above may be one of many known to those skilled in the art, for example flat shading or Phong shading. Another common shading technique is known as Gouraud shading, in which the red, green, and blue components (R,G,B) of color at each pixel within the triangle T is computed by simple, linear interpolation of the colors at the vertices that define the triangle T. In Gouraud shading, it may be shown that:

$$R = A_r X + B_r Y + C_r$$

$$G = A_g X + B_g Y + C_g$$

$$B = A_b X + B_b Y + C_b$$

where (x,y) are the integer, raster coordinates of the pixel and ($A_r, B_r, C_r$, etc.) are constants which depend upon the triangle's vertex coordinates and vertex colors.

However, computing the color at each pixel according to the equations above is computationally inefficient. Instead, it is preferable to use the differential form of the equations as follows:

$$\Delta R = A_r \Delta x + B_r \Delta Y$$

$$\Delta G = A_g \Delta x + B_g \Delta Y$$

$$\Delta B = A_b \Delta X + B_b \Delta Y$$

where ($\Delta X, \Delta y$) are integer raster displacements from the previous pixel to the current pixel.

In this case, the color values at the current pixel, which is displaced ($\Delta x, \Delta y$) from the previous pixel are computed by the following equations:

$$R_{current} = R_{previous} + \Delta R = R_{previous} + A_r \Delta x + B_r \Delta y$$

$$G_{current} = G_{previous} + \Delta G = G_{previous} + A_g \Delta x + B_g \Delta y$$

$$B_{current} = B_{previous} + \Delta B = B_{previous} + A_b \Delta x + B_b \Delta y$$

This differential form is useful because the rasterization proceeds from one pixel to the next across scan lines, in which case $(\Delta x, \Delta y)=(1,0)$ such that the differential form of the equations presented above reduces to:

$$R_{current}=R_{previous}+A_r$$

$$G_{current}=G_{previous}+A_g$$

$$B_{current}=B_{previous}+A_b$$

Thus, two multiplication operations and two addition operations in each of the full form equations presented above may be reduced to a single addition operation. This efficiency is extremely important, because these computation operations form the heart of the "inner loop" of rasterization, which is typically performed millions of times in rendering a complex scene.

As described above, the rasterization engine 212 of the first embodiment performs the computationally intensive shading calculations on a triangle only if a visible pixel is found, thus eliminating shading calculations performed on all-hidden triangles. In this manner, the "inner loop" of the rasterization process is made even more efficient. Moreover, for all-visible triangles, performance is only slightly degraded because the rasterization engine 212 performs the test mode only once to determine that the first pixel is visible and then immediately branches to normal mode, wherein the first pixel's visibility is tested again. However, this slight redundancy for all-visible triangles is greatly outweighed by the wholesale avoidance of shading calculations for all-hidden triangles.

For partially hidden triangles, the performance of the rasterization engine 212 may be significantly degraded, because, in the test mode, many pixels may be tested before a visible one is found, and the same pixels redundantly traversed again in normal mode. However this problem is actually minor, since, in typical scenes, partially hidden triangles are comparatively rare. Moreover, this problem may be minimized by the second embodiment of the present invention.

Figure 5:
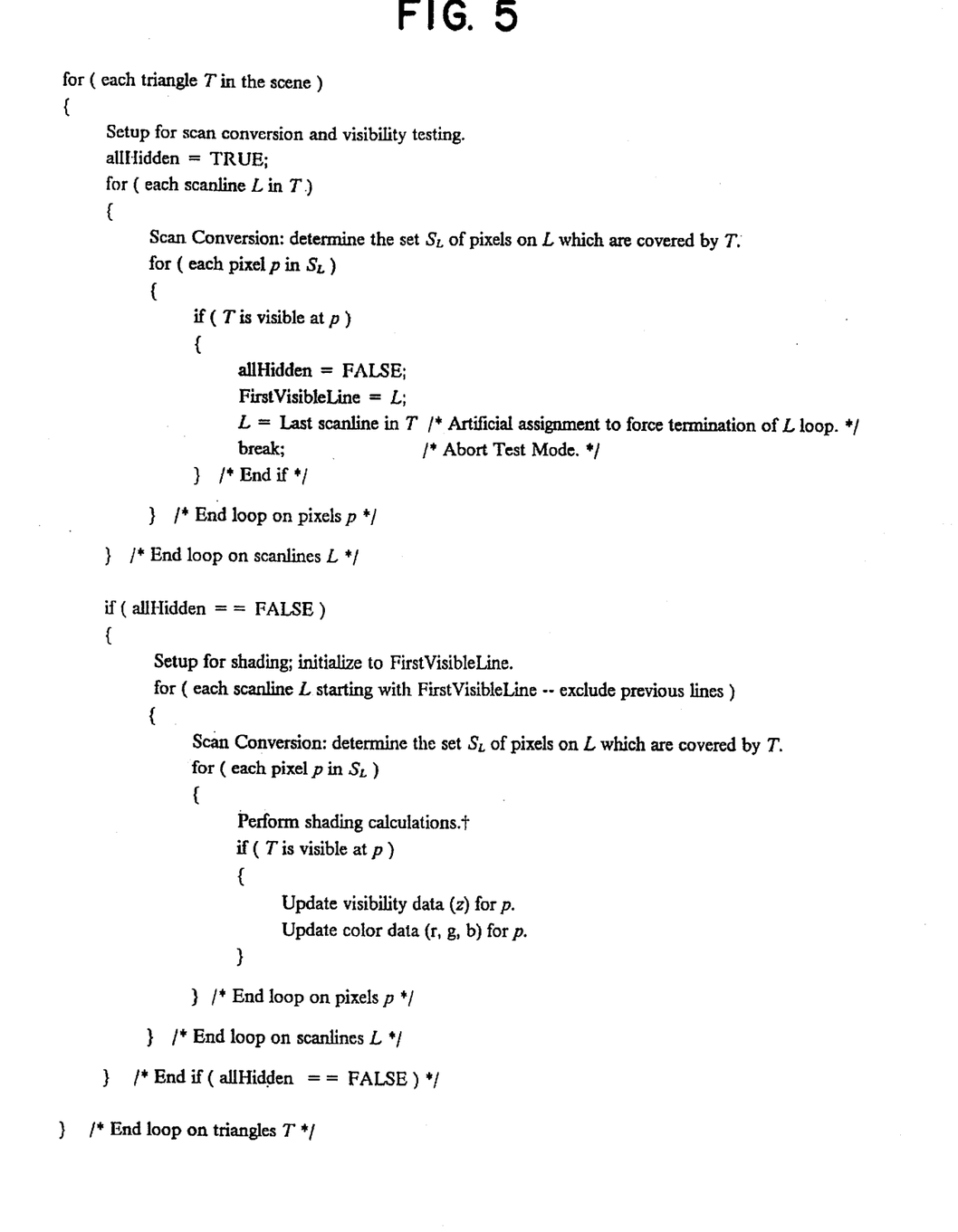
FIG. 5 is pseudocode that illustrates the operation of the rasterization engine of FIG. 3 according to a second embodiment of the present invention.

A second embodiment of the present invention is shown in FIG. 5. Although slightly more complicated than the first embodiment, the second embodiment makes an even greater improvement to the efficiency of the rasterization process. As shown, for each triangle T in the scene, the rasterization engine 212 initially enters the test mode and performs setup operations required for scan conversion and visibility testing. Next, an allHidden flag is set to true. Like the first embodiment, the value of the allHidden flag indicates the visibility of the triangle. For example, if the allHidden flag has a value of true, the triangle T is entirely hidden; and if the allHidden flag has a value of false, the triangle T is partially or fully visible. The rasterization engine 212 then decomposes the triangle T into one or more scan lines, and for a first scan line L determines the set of pixels $S_L$ covering T. A more detailed description of the steps performed in decomposing the triangle into scan lines and associated pixels may be found in Foley, Van Dam, Feiner and Hughes, Computer Graphics Principles and Practice, p. 884 (2nd Ed. 1990), incorporated by reference above in its entirety.

After determining the set of pixels $S_L$ on the scan line L which cover T, the rasterization engine 212 continues the test mode by testing the visibility of each pixel within the set $S_L$. As is conventional, visibility testing is performed by comparing the depth value of the pixel of set $S_L$ with the depth value stored in the Z-buffer 214. If a visible pixel is found on the scan line L, the rasterization engine 212 ends the test mode by setting the allHidden flag to false and storing an ID that identifies the scan line and then branches to normal mode. However, if a visible pixel is not found on the scan line L, operation continues to the next scan line for scan conversion and visibility testing. If all scan lines of the triangle T have been scan converted and visibility tested in the test mode, the operation of the rasterization engine 212 continues to the next triangle until all triangles in the three-dimensional scene have been processed by the rasterization engine 212.

As shown in FIG. 5, in normal mode, the rasterization engine 212 of the second embodiment begins by performing setup operations required for shading calculations. Then, beginning at the scan line corresponding to the ID stored in the test mode, the rasterization engine 212 determines the set of pixels $S_L$ which cover T. After determining the set of pixels $S_L$ on the scan line, the rasterization engine 212 continues the normal mode by performing visibility testing and shading for each pixel in the set $S_L$. If during visibility testing the rasterization engine 212 determines the triangle T is visible at a particular pixel within the set $S_L$, the depth value stored in the Z-buffer 212 at an address corresponding to the particular pixel is updated with the depth value of the triangle T at the particular pixel, and the r,g,b values of the triangle at the particular pixel calculated during shading are written to an address of the frame buffer 216 that corresponds to the particular pixel.

However, if during visibility testing, the rasterization engine 212 determines triangle T is not visible at a particular pixel within the set $S_L$, flow continues to the next pixel for visibility testing and shading above until all pixels in the set $S_L$ have been processed. Upon completion of processing of all pixels in the set $S_L$, the rasterization engine 212 continues the operations described above for the next scan line. If all scan lines of the triangle T have been processed in the normal mode, the operation of the rasterization engine 212 continues to the next triangle until all triangles in the three-dimensional scene have been processed by the rasterization engine 212.

The normal mode of the second embodiment provides improved efficiency as compared to the normal mode of the first embodiment by eliminating the redundant calculation for scan lines prior to first visible scan line (i.e., the scan line identified by the ID stored during the testing mode).

Figure 6:
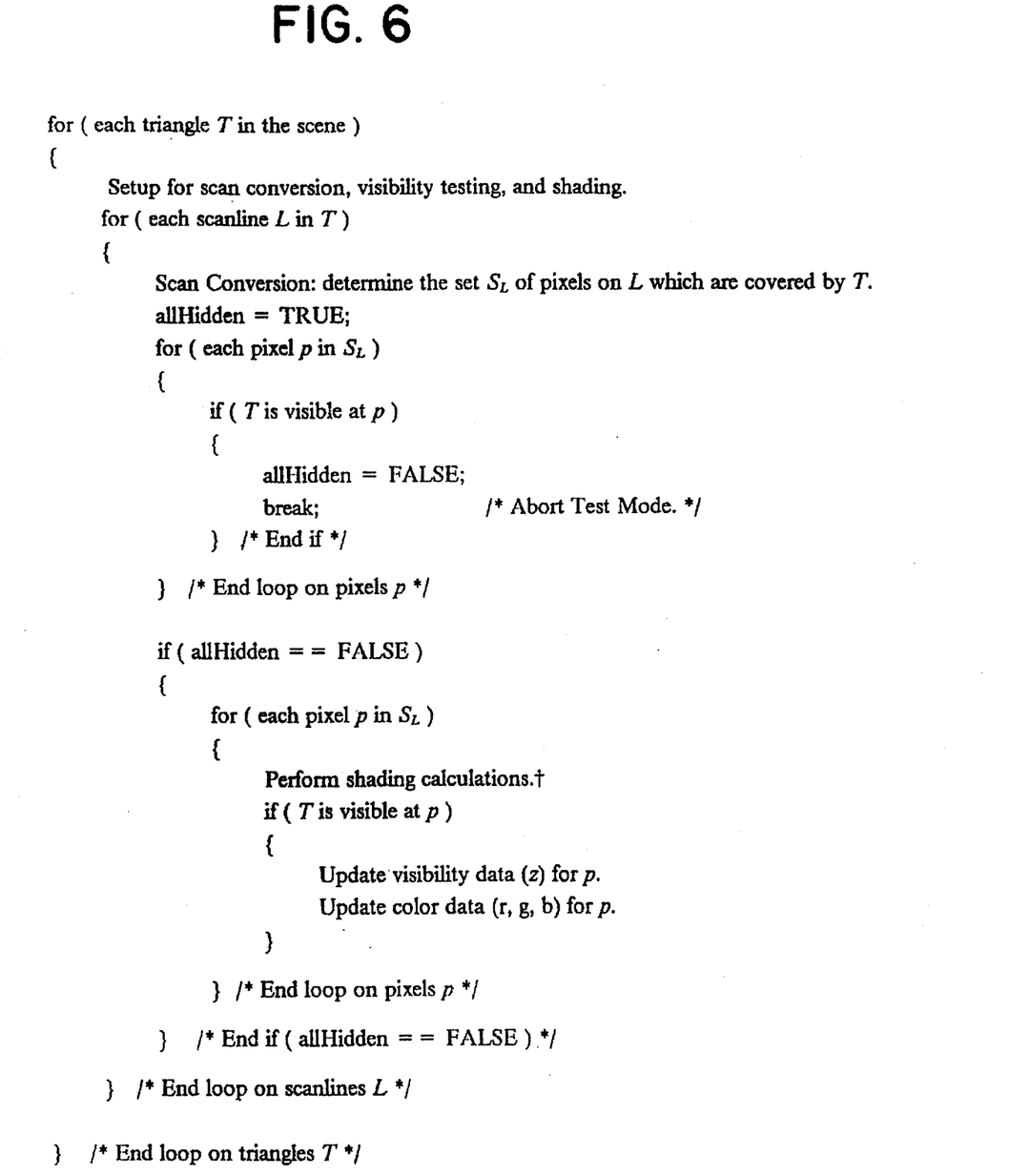
FIG. 6 is pseudocode that illustrates the operation of the rasterization engine of FIG. 3 according to an alternate embodiment of the present invention.

In an alternative embodiment as illustrated in FIG. 6, the present invention may also be implemented on a per scan line basis rather than a per triangle basis. More specifically, for each triangle T in the scene, the rasterization engine 212 initially performs setup operations required for scan conversion, visibility testing and shading calculations. The rasterization engine 212 then enters the test mode and decomposes the triangle T into one or more scan lines. For a first scan line L covering the triangle T, the rasterization engine 212 determines the set of pixels $S_L$ on the scan line L which cover T. A more detailed description of the steps performed in decomposing the triangle T into scan lines and associated pixels may be found in Foley, Van Dam, Feiner and Hughes, Computer Graphics Principles and Practice, p. 884 (2nd Ed. 1990), incorporated by reference above in its entirety. Next, an allHidden flag is set to true. In this case, unlike the first and second embodiments, the value of the allHidden flag indicates the visibility of the pixels of the scan line. For example, if the allHidden flag has a value of true, all pixels in the set $S_L$ are hidden; if the allHidden flag has a value of false, one or more pixels of the set $S_L$ are visible.

The rasterization engine 212 then continues the test mode by testing the visibility of each pixel within the set $S_L$. As is conventional, visibility testing is performed by comparing the depth value of the pixel of set $S_L$ with the depth value stored in the Z-buffer 214. If a visible pixel is found on the scan line L, the rasterization engine 212 ends the test mode by setting the allHidden flag to false and then branches to normal mode. However, if after testing the visibility of all pixels in the scan line L no visible pixels have been found in the test mode (i.e. the allHidden flag is still true), the normal operation mode of scan line is bypassed and the rasterization engine 212 repeats the operations described above for the next scan line until all scan lines of the triangle T have been processed by the rasterization engine 212.

As shown in FIG. 6, in normal mode, the rasterization engine 212 begins by determining, for each scan line L, the set of pixels $S_L$ which cover T. After determining the set of pixels $S_L$ on the scan line L, the rasterization engine 212 continues the normal mode by performing visibility testing and shading for each pixel in the set $S_L$. If, during visibility, testing the rasterization engine 212 determines the triangle T is visible at a particular pixel within the set $S_L$, the depth value stored in the Z-buffer 212 at an address corresponding to the particular pixel is updated with the depth value of the triangle T at the particular pixel, and the r,g,b values of the triangle at the particular pixel calculated during shading are written to an address of the frame buffer 216 that corresponds to the particular pixel.

However, if during visibility testing, the rasterization engine 212 determines the triangle T is not visible at a particular pixel within the set $S_L$, flow continues to the next pixel for visibility testing and shading until all pixels in the set $S_L$ have been processed. Upon looping through all pixels in the set $S_L$, the rasterization engine 212 continues the operations described above for the next scan line.

Upon completion of all scan lines for triangle T in either the test mode or normal mode, the operation of the rasterization engine 212 continues to the next triangle until all triangles in the three-dimensional scene have been processed by the rasterization engine 212.

In addition, the graphics subsystem 110 of the present invention may perform lighting calculations that simulate the effects of light sources upon the surfaces of the triangles of the scene. Typically, the lighting calculations depend upon (a) properties of the viewer, (b) the properties of the triangles being rendered, and (c) the properties of one or more light sources. Properties of the viewer may include the position and orientation of the viewer with respect to the triangles being rendered. The properties of the triangles may include the location and normal vector for each point to be considered, and a set of reflection coefficients. The properties of the light sources depend upon the type (ambient, directional, local, spotlight, etc.) and may include intensity, color, direction, attenuation factors, and cone angle. A more detailed description of the steps for carrying out such lighting calculations may be found in Foley, Van Dam, Feiner and Hughes, Computer Graphics Principles and Practice, pp. 721–814 (2nd Ed. 1990), incorporated by reference above in its entirety.

Typically, these lighting calculations are performed once during the rendering process for every vertex of each triangle in the scene. When Gouraud shading is utilized, the lighting calculations may be performed by the transformation engine 208 or clipping engine 210. Thus, the operation of the rasterization engine 212 as described above remains unchanged.

However, the lighting calculations may be calculated for every pixel. Typically, this is accomplished in conjunction with Phong shading. In this case, the lighting calculations are embedded into the shading calculations of FIG. 4 and 5 and performed by the rasterization engine 212.

In summary, by separating the rasterization process into two modes, a test mode and a normal mode, the present invention provides improved efficiency over prior rasterization schemes by eliminating the shading calculations associated with hidden triangles.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. In a computer graphics system wherein objects are represented by one or more primitives, a method of rasterizing the primitives for display comprising the following steps applied to each primitive T in succession:

first, in a test mode of operation, identifying a first sequence of pixels that cover the primitive T, selecting in succession a test pixel from said first sequence of pixels, and, for the test pixel, performing a visibility test to determine if the primitive T is visible at the test pixel, and branching to a normal mode of operation if it is determined that the primitive T is visible at the test pixel, wherein, in said test mode of operation, shading calculations are not performed for the test pixel; and second, in the normal mode of operation, if and only if branched to from the test mode of operation, identifying a second sequence of pixels that cover the primitive T, for each given pixel with the second sequence of pixels, performing shading calculations to compute color of the primitive T at the given pixel within the second sequence of pixels, performing a visibility test to determine if the primitive T is visible at the given pixel within the second sequence of pixels, and if the primitive T is visible at the given pixel within the second sequence of pixels, writing the computed color to a frame buffer for display.

2. The method of claim 1, wherein, in the test mode of operation, the visibility test that determines if the primitive T is visible at the test pixel includes the following steps:

computing a depth value of the test pixel, and comparing the computed depth value of the test pixel with a depth value stored in a z-buffer to determine if the test pixel is visible;

wherein, in the normal mode of operation, the visibility test that determines if the primitive T is visible at the given pixel within the second sequence of instructions includes the following steps:

computing a depth value of the given pixel, comparing the computed depth value of the given pixel with a depth value stored in the z-buffer to determine if the given pixel is visible, and if the given pixel is determined to be visible, storing the computed depth value in the z-buffer.

3. The method of claim 1, wherein the test mode of operation includes the following steps:

determining a set L of successive scan lines that cover the primitive T, wherein the set L includes a start scan line and an end scan line;

for the start scan line within set L,
  determining a sequence P of pixels within the start scan line that cover the primitive T, wherein the sequence P of pixels include a start pixel p and an end pixel,
  performing a visibility test that determines if the primitive T is visible at the start pixel p of the sequence P,
    wherein, if the primitive T is visible at the start pixel p, then branching to the normal mode of operation,
    wherein, if the primitive T is not visible at the start pixel p, repeating the visibility test for the next pixel in the sequence P until the visibility test has been performed on the end pixel within sequence P,
  if the visibility test has been performed on the end pixel within sequence P, then continuing the test mode of operation for a next scan line within the set L until the end scan line within set L has been processed; and
wherein the normal mode of operation includes the following steps:
for the start scan line within set L,
  determining the sequence P of pixels within the start scan line that cover the primitive T,
  for each given pixel within sequence P,
    performing shading calculations to compute color of the primitive T at the given pixel,
    performing a visibility test to determine if the primitive T is visible at the given pixel, and
    if the primitive T is visible at the given pixel, writing the computed color to the frame buffer for display; and
  after shading calculations and visibility testing have been performed for all pixels within sequence P, continuing normal mode of operation for a next scan line within set L until the end scan line within set L have been processed.

4. The method of claim 3,
wherein, in the test mode of operation, the visibility test that determines if the primitive T is visible at the start pixel p includes the following steps:
computing a depth value of the pixel p, and
comparing the computed depth value of the pixel p with a depth value stored in a z-buffer to determine if the pixel p is visible; and
wherein, in the normal mode of operation, the visibility test that determines if the primitive T is visible at the given pixel includes the following steps:
computing a depth value of the given pixel,
comparing the computed depth value of the given pixel with a depth value stored in the z-buffer to determine if the given pixel is visible; and
if the given pixel is determined to be visible, storing the computed depth value in the z-buffer.

5. The method of claim 1,
wherein the test mode of operation includes the following steps:
determining a set L of successive scan lines that cover the primitive T, wherein the set L includes a start scan line and an end scan line;
selecting the start scan line within set L as a test scan line,
  determining a sequence P of pixels within the test scan line that cover the primitive T, wherein the sequence P includes a start pixel p and an end pixel,
  performing a visibility test to determine if the primitive T is visible at the start pixel p,
    wherein, if the primitive T is visible at the start pixel p, an ID that identifies the test scan line is stored and operation branches to the normal mode of operation,
    wherein, if the primitive T is not visible at the start pixel p,
    repeating the visibility test for the next pixel in the sequence P until the end pixel in the sequence P has been processed, and
  if the visibility test has been performed with respect to the end pixel within sequence P, then continuing the test mode of operation for a next scan line within the set L until the end scan line within set L has been processed; and
wherein the normal mode of operation includes the following steps:
for the test scan line identified by the ID stored in the test mode of operation,
  determining the sequence of pixels P1 within the test scan line that cover the primitive T,
  for each given pixel within the sequence P1,
    performing shading calculations to compute color of the primitive T at the given pixel,
    performing a visibility test to determine if the primitive T is visible at the given pixel, and
    if the primitive T is visible at the given pixel, writing the computed color to the frame buffer for display; and
  after shading calculations and visibility testing have been performed for all pixels within sequence P1, continuing normal mode of operation for a next successive scan line in set L until the end scan line within set L has been processed.

6. The method of claim 5,
wherein, in the test mode of operation, the visibility test that determines if the primitive T is visible at start pixel p includes the following steps:
computing a depth value of the pixel p, and
comparing the computed depth value of the pixel p with a depth value stored in a z-buffer to determine if the pixel p is visible;
wherein, in the normal mode of operation, the visibility test that determines if the primitive T is visible at the given pixel within the sequence P1 includes the following steps:
computing a depth value of the given pixel,
comparing the computed depth value of the given pixel with a depth value stored in the z-buffer to determine if the given pixel is visible, and
if the given pixel is determined to be visible, storing the computed depth value in the z-buffer.

7. The method of claim 1,
further comprising the step of determining a set L of successive scan lines that cover the primitive T,
wherein the test mode of operation includes the following steps applied to each scan line within the set L in succession:
determining a sequence P of pixels within the scan line that cover the primitive T, wherein the sequence P has a start pixel p and an end pixel;
performing a visibility test that determines if the primitive T is visible at the start pixel p,
  wherein, if the primitive T is visible at the pixel p, then branching to the normal mode of operation, wherein, if the primitive T is not visible at the pixel p, then repeating the visibility test for the next pixel in the sequence P until the end pixel within sequence P has been processed; and wherein the normal mode of operation includes the following step:

for each given pixel within sequence P,
performing shading calculations to compute color of the primitive T at the given pixel,
performing a visibility test that determines if the primitive T is visible at the given pixel, and
if the primitive T is visible at the given pixel, writing the computed color to the frame buffer for display.

8. The method of claim 7,
wherein, in the test mode of operation, the visibility test that determines if the primitive T is visible at the start pixel p includes the following steps:
computing a depth value of the pixel p, and
comparing the computed depth value of the pixel p with a depth value stored in a z-buffer to determine if the pixel p is visible;
wherein, in the normal mode of operation, the visibility test that determines if the primitive T is visible at the given pixel includes the following steps:
computing a depth value of the given pixel,
comparing the computed depth value of the given pixel with a depth value stored in the z-buffer to determine if the given pixel is visible, and
if the given pixel is determined to be visible, storing the computed depth value in the z-buffer.

9. A computer graphics system for displaying objects represented by one or more primitives comprising:
a rasterizer for rasterizing in succession each primitive T for display,
wherein the rasterizer, in a test mode of operation,
identifies a first sequence of pixels that cover the primitive T,
selects in succession a test pixel from said first sequence of pixels, and, for the test pixel,
performs a visibility test to determine if the primitive T is visible at the test pixel, and
branches to a normal mode of operation if it is determined that the primitive T is visible at the test pixel,
wherein, in said test mode of operation, shading calculations are not performed for the test pixel; and
wherein, in the normal mode of operation, if and only if branched to from the test mode of operation, the rasterizer
identifies a second sequence of pixels that cover the primitive T,
for each given pixel with the second sequence of pixels,
performs shading calculations to compute color of the primitive T at the given pixel within the second sequence of pixels,
performs a visibility test to determine if the primitive T is visible at the given pixel within the second sequence of pixels, and
if the primitive T is visible at the given pixel within the second sequence of pixels, writes the computed color to a frame buffer for display.

10. The computer graphics system of claim 9,
wherein, in the test mode of operation, in performing the visibility test that determines if the primitive T is visible at the test pixel, the rasterizer
computes a depth value of the test pixel, and
compares the computed depth value of the test pixel with a depth value stored in a z-buffer to determine if the test pixel is visible;
wherein, in the normal mode of operation, in performing the visibility test that determines if the primitive T is visible at the given pixel within the second sequence of instructions, the rasterizer
computes a depth value of the given pixel,
compares the computed depth value of the given pixel with a depth value stored in the z-buffer to determine if the given pixel is visible, and
if the given pixel is determined to be visible, stores the computed depth value in the z-buffer.

11. The computer graphics system of claim 9,
wherein, in the test mode of operation, the rasterizer
determines a set L of successive scan lines that cover the primitive T, wherein the set L includes a start scan line and an end scan line,
for the start scan line within set L,
determines a sequence P of pixels within the start scan line that cover the primitive T, wherein the sequence P of pixels include a start pixel p and an end pixel,
performs a visibility test to determine if the primitive T is visible at the start pixel p of the sequence P,
wherein, if the primitive T is visible at the start pixel p, then operation branches to the normal mode of operation,
wherein, if the primitive T is not visible at the pixel p, then the visibility test is repeated for the next pixel in the sequence P until the visibility test has been performed on the end pixel within sequence P, and
if the visibility test has been performed on the end pixel within sequence P, then continuing the test mode of operation for a next scan line within the set L until the end scan line within set L has been processed; and wherein, in the normal mode of operation, the rasterizer
for the start scan line within set L,
determines the sequence P of pixels within the start scan line that cover the primitive T,
for each given pixel within sequence P,
performs shading calculations to compute color of the primitive T at the given pixel,
performs a visibility test to determine if the primitive T is visible at the given pixel, and
if the primitive T is visible at the given pixel, writes the computed color to the frame buffer for display; and
after shading calculations and visibility testing have been performed for all pixels within sequence P, continuing normal mode of operation for a next scan line within set L until the end scan line within set L have been processed.

12. The computer graphics system of claim 11,
wherein, in the test mode of operation, in performing the visibility test that determines if the primitive T is visible at the start pixel p, the rasterizer
computes a depth value of the pixel p, and
compares the computed depth value of the pixel p with a depth value stored in a z-buffer to determine if the pixel p is visible; and
wherein, in the normal mode of operation, in performing the visibility test that determines if the primitive T is visible at the given pixel, the rasterizer computes a depth value of the given pixel, compares the computed depth value of the given pixel with a depth value stored in the z-buffer to determine if the given pixel is visible, and if the given pixel is determined to be visible, stores the computed depth value in the z-buffer.

13. The computer graphics system of claim 9, wherein, in the test mode of operation, the rasterizer determines a set L of successive scan lines that cover the primitive T, wherein the set L includes a start scan line and an end scan line, selects the start scan line within set L as a test scan line, determines a sequence P of pixels within the test scan line that cover the primitive T, wherein the sequence P includes a start pixel p and an end pixel, performs a visibility test to determine if the primitive T is visible at the start pixel P, wherein, if the primitive T is visible at the start pixel p, then an ID that identifies the test scan line is stored and operation branches to the normal mode of operation, wherein, if the primitive T is not visible at the start pixel p, then the visibility test is repeated for the next pixel in the sequence P until the end pixel in the sequence P has been processed, if the visibility test has been performed with respect to the end pixel within sequence P, then continues the test mode of operation for a next scan line within the set L until the end scan line within set L has been processed; and wherein, in the normal mode of operation, the rasterizer for the test scan line identified by the ID stored in the test mode of operation, determines the sequence of pixels P1 within the test scan line that cover the primitive T, for each given pixel within the sequence P1, performs shading calculations to compute color of the primitive T at the given pixel, performs a visibility test to determine if the primitive T is visible at the given pixel, and if the primitive T is visible at the given pixel, writes the computed color to the frame buffer for display, and after shading calculations and visibility testing have been performed for all pixels within sequence P1, continues normal mode of operation for a next successive scan line in set L until the end scan line within set L has been processed.

14. The computer graphics system of claim 13, wherein, in the test mode of operation, in performing the visibility test that determines if the primitive T is visible at start pixel p, the rasterizer computes a depth value of the pixel p, and compares the computed depth value of the pixel p with a depth value stored in a z-buffer to determine if the pixel p is visible;

wherein, in the normal mode of operation, in performing the visibility test that determines if the primitive T is visible at the given pixel within the sequence P1, the rasterizer computes a depth value of the given pixel, compares the computed depth value of the given pixel with a depth value stored in the z-buffer to determine if the given pixel is visible, and if the given pixel is determined to be visible, stores the computed depth value in the z-buffer.

15. The computer graphics system of claim 9, wherein the rasterizer determines a set L of successive scan lines that cover the primitive T, wherein, in the test mode of operation, for each successive scan line within the set L, the rasterizer determines a sequence P of pixels within the scan line that cover the primitive T, wherein the sequence P has a start pixel p and an end pixel;

performs a visibility test that determines if the primitive T is visible at the start pixel p, wherein, if the primitive T is visible at the pixel p, then operation branches to the normal mode of operation, and wherein, if the primitive T is not visible at the pixel p, then the visibility test is repeated for the next pixel in the sequence P until the end pixel within sequence P has been processed; and wherein, in the normal mode of operation, the rasterizer for each given pixel within sequence P, performs shading calculations to compute color of the primitive T at the given pixel, performs a visibility test that determines if the primitive T is visible at the given pixel, and If the primitive T is visible at the given pixel, writes the computed color to the frame buffer for display.

16. The computer graphics system of claim 15, wherein, in the test mode of operation, in performing the visibility test that determines if the primitive T is visible at the start pixel p, the rasterizer computes a depth value of the pixel p, and compares the computed depth value of the pixel p with a depth value stored in a z-buffer to determine if the pixel p is visible; and wherein, in the normal mode of operation, in performing the visibility test that determines if the primitive T is visible at the given pixel, the rasterizer computes a depth value of the given pixel, compares the computed depth value of the given pixel with a depth value stored in the z-buffer to determine if the given pixel is visible, and if the given pixel is determined to be visible, stores the computed depth value in the z-buffer.

\* \* \* \* \*